United States Patent

[11] 3,579,074

[72] Inventor Clement Michael Richell
  Warren, Ohio
[21] Appl. No. 683,760
[22] Filed Nov. 2, 1967
[45] Patented May 18, 1971
[73] Assignee Ray R. Roberts
  Warren, Ohio
  fractional part interest to each

[54] ELECTRONIC POWERED PULSE AMPLIFIER
  22 Claims, 5 Drawing Figs.
[52] U.S. Cl. .................................................. 320/1,
  307/110, 307/252
[51] Int. Cl. ............................................ H02m 3/00
[50] Field of Search ....................................... 320/1;
  307/108, 246, 252, 252 (D); 321/15; 307/109,
  110; 328/67, 61

[56] References Cited
  UNITED STATES PATENTS
1,508,162 9/1924 Chubb .......................... 321/15

| | | | |
|---|---|---|---|
| 2,710,357 | 6/1955 | Kordesch | 307/110 |
| 3,243,729 | 3/1966 | Olson et al. | 307/252X |
| 2,773,200 | 12/1956 | Guggi | 307/110 |
| 2,878,401 | 3/1959 | Schwemin | 307/110 |
| 3,267,299 | 8/1966 | Bartelink | 307/109 |

Primary Examiner—Terrell W. Fears
Attorney—Buell, Blenko & Ziesenheim

ABSTRACT: A power pulse amplifier comprises a plurality of capacitors, a charging circuit and a discharging circuit. The charging circuit is arranged to connect the capacitors or groups thereof in parallel to a source of charging potential and includes a switching arrangement for charging individual capacitors or the groups thereof individually and sequentially. The discharge circuit is arranged for discharging all of the capacitors or the groups of capacitors simultaneously after all of the capacitors have been charged sequentially. In certain embodiments the discharge circuit discharges the capacitors simultaneously in parallel while in other embodiments the discharging circuit discharges the capacitors or the groups thereof simultaneously in series.

Patented May 18, 1971

INVENTOR
Clement M. Richell.
BY
HIS ATTORNEYS

INVENTOR
Clement M. Richell
BY
HIS ATTORNEYS

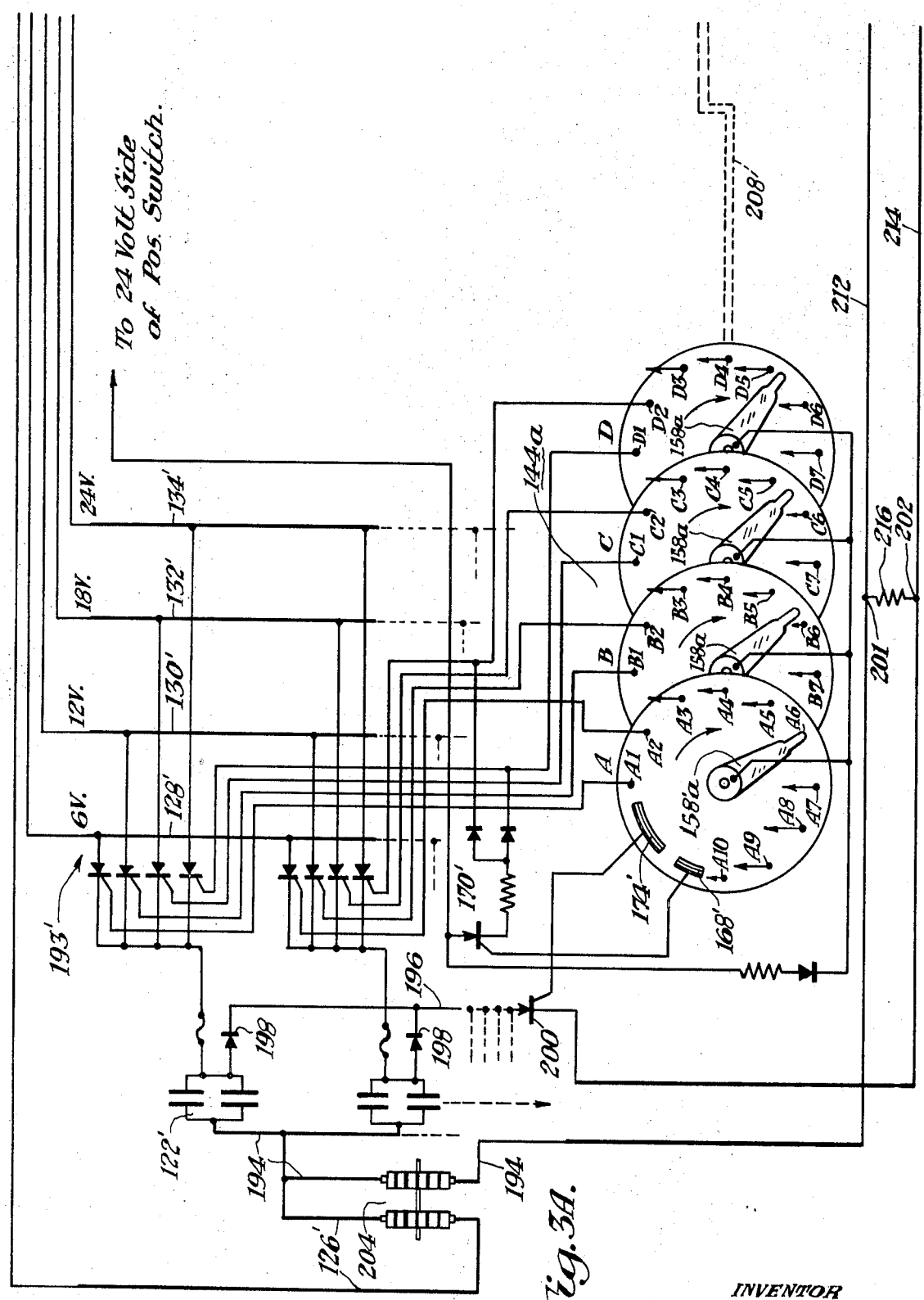

ELECTRONIC POWERED PULSE AMPLIFIER

The preset invention relates to an electronic powered pulse amplifier and more particularly to an amplifier of the character described and having unique means for sequentially charging a capacitor bank, for either parallel or series discharging the bank, and for readily varying the duration and spacing of output power pulses to control the total available power.

There are many applications wherein pulses with relatively high voltage and amperage are required for energizing purposes, in both stationary or mobile or field applications, such as automotive, railway, marine, aeronautical and planetary-explorative. In many of these applications, an electrical power supply is very limited, depending for example on small fossil-fueled generators, one or more storage batteries, or various conversion devices powered by solar, wind, or water energies. In many stationary applications, the input power is limited in accordance with conventional line voltage. In automotive applications involving electrically powered vehicles, it is desirable to energize an electric motor therefor by such pulses inasmuch as the speed of the motor can be readily controlled by varying the duration and/or spacing of the pulses. Moreover, extremely high torques can be realized as a result of multiplying both the voltage and the amperage of electric pulses to the drive motor. Conventional pulse amplifiers are capable of supplying only high voltage surges at relatively low current ratings.

For heating purposes, the use of both multiplied voltages and amperages permit the attainment of high heating values with heavily constructed heating elements capable of operating at high voltages and amperages for improved heating values.

Conventional electrical power supplies provide either increased voltages at reduced amperage or increased currents at reduced voltage. In conventional power supplies utilizing capacitor banks, mechanical switching means were generally used to control the charging and discharging of the capacitor banks resulting in poor initial control and eventually complete loss of control through wearing of electrical contacts and other moving mechanical parts handling relatively large currents. Although certain of conventional electrical power supplies operate satisfactorily for applications requiring either high voltages at very low amperage or high currents at very low voltage, no adequate multiplying circuit is known which is capable of supplying power pulses of variable duration and spacing at both high amperages and high voltages. In particular there is no such circuit known capable of a high voltage and high amperage DC output and energizable with a relatively low voltage input. As mentioned above many applications require an easily controllable, pulsed high power source where only low voltage power is conventionally available. For example in electric automotive and electric heating applications from an electrical power supply to the load device. Conventional multiplying or amplifying circuits are incapable of operation over extended periods of time from a portable electric power source of low voltage, such as a storage battery.

I overcome these disadvantages of the prior art by providing a pulsed electronic amplifier capable of multiplying both voltage and amperage and of varying both the duration and spacing of output power pulses. The disclosed amplifier can operate from a relatively low voltage power source such as an automobile storage battery or batteries or a rectifier energized by conventional AC line voltage. My amplifier employs a unique control arrangement for charging and discharging a bank of capacitors. The control arrangement includes one or more rotary switches which in turn control electronic switch means. The rotary switch or switches handle only low voltage current and therefor need not be heavily constructed and are not particularly subject to either mechanical or electrical wear. Moreover, the duration and spacing of pulses can be readily varied either by varying the rotational speed of the rotary switch or by an electronic speed control unit provided in certain forms of my amplifier. In accordance with another novel feature of my amplifier. a supplementary or booster charging circuit is provided and controlled in a manner similar to that outlined above to ensure fully charging the capacitors before their discharging. In operating the disclosed forms of my novel amplifier, I charge a bank of series or series-parallel connected capacitors in sequence, followed by applying a booster charge to all of the capacitors simultaneously to ensure that the capacitors are fully charged. After the booster charge I then discharge the capacitors in series or in parallel, by means of my novel control or capacitor-dumping circuit, to obtain both amplified voltage and amplified amperage.

I accomplish these desirable results by providing a power pulse amplifier comprising a plurality of capacitance means, a charging circuit for connecting each of said capacitance means in parallel to a source of charging potential, said circuit including switch means connected between each of said capacitance means and said potential source, and sequential switch-actuating means coupled to said switch means for actuating said switch means in sequence to their conductive conditions so that said capacitance means are charged sequentially, and a discharge circuit coupled to said capacitance means for discharging said capacitance means simultaneously.

I also desirably provide a power pulse amplifier wherein a booster circuit is coupled to said potential source and in parallel to said capacitance means for charging said capacitance means simultaneously following the sequential charging thereof by said switch means.

I also desirably provide a power pulse amplifier wherein said switch means are SCR's and said switch-actuating means include a sequential pulse emitting circuit for conducting triggering pulses in sequence to the gates respectively of said SCR's.

I also desirably provide a power pulse amplifier wherein said pulse emitting circuit includes rotary switch means having a rotatably contact connected to said source and stationary contacts coupled respectively to said SCR gates, and variable speed drive means are provided for said rotary switch means.

I also desirably provide a power pulse amplifier wherein said capacitance means are connected in series by said discharge circuit, said discharge circuit including normally open switch means coupled in alternating array between each of said capacitance means, said additional switch means being so coupled to said sequential switch-actuating means that they are actuated simultaneously to their conductive conditions by said switch-actuating means after the sequential actuation of said first-mentioned switch means.

During the foregoing discussion, various objects, features and advantages of the invention have been set forth. These and other objects, features and advantages of the invention together with structural details thereof will be elaborated upon during the forthcoming description of certain presently preferred embodiments of the invention and presently preferred methods of practicing the same.

In the accompanying drawings I have shown certain presently preferred embodiments of the invention and have illustrated certain presently preferred methods of practicing the same, wherein.

Figure 1:
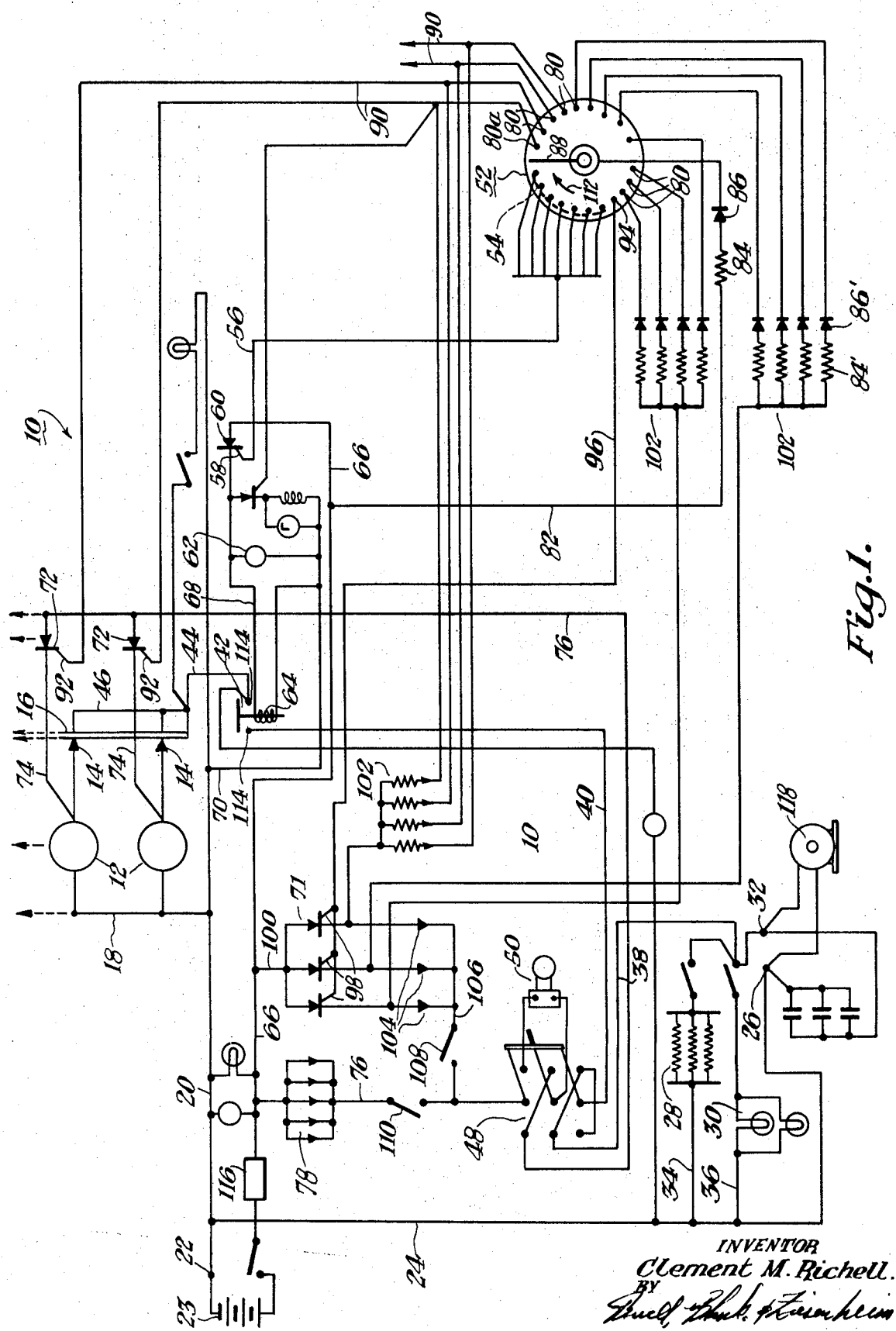
FIG. 1 is a schematic circuit diagram of one arrangement of my novel pulse amplifier.
Figure 3B:
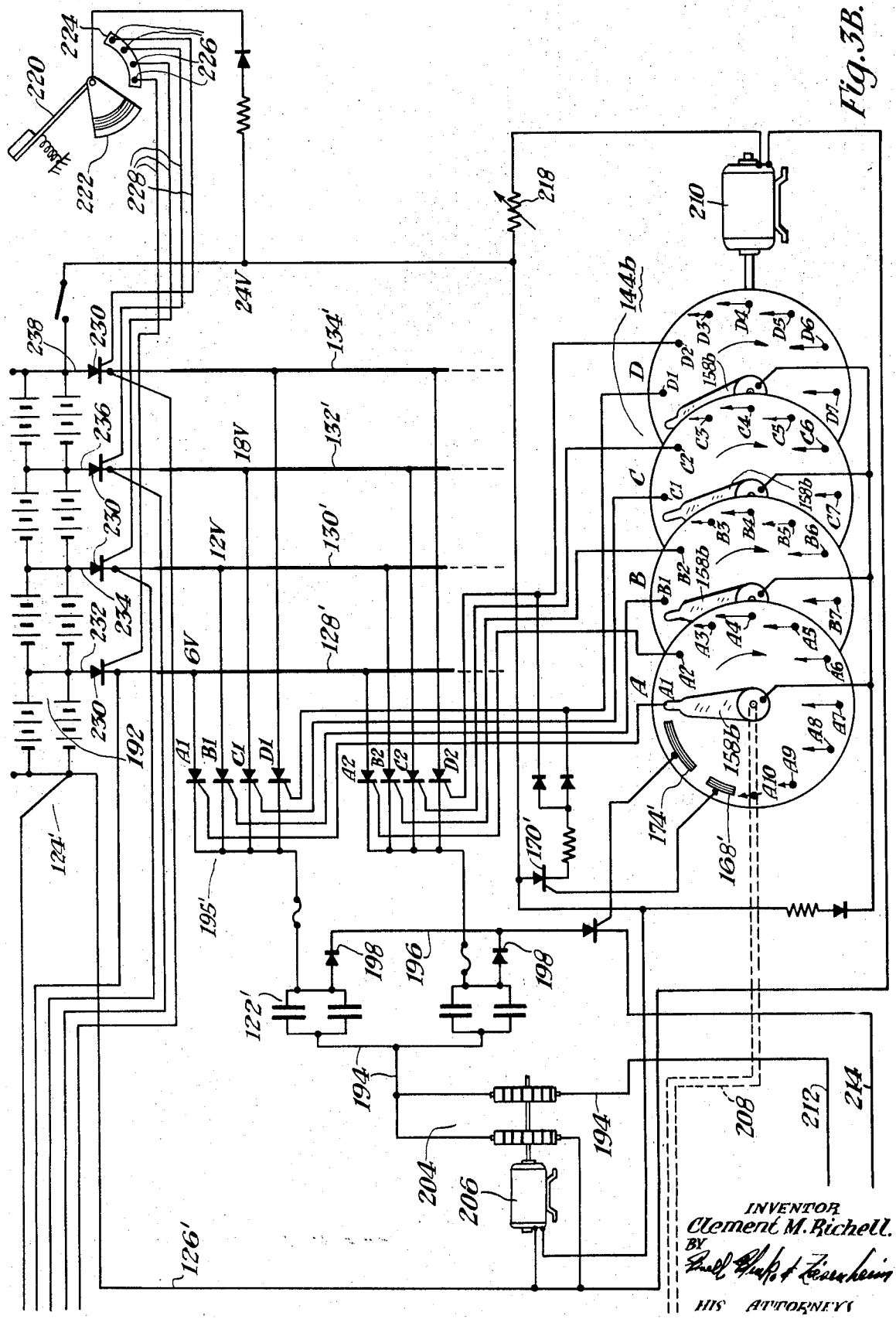
Figure 4:
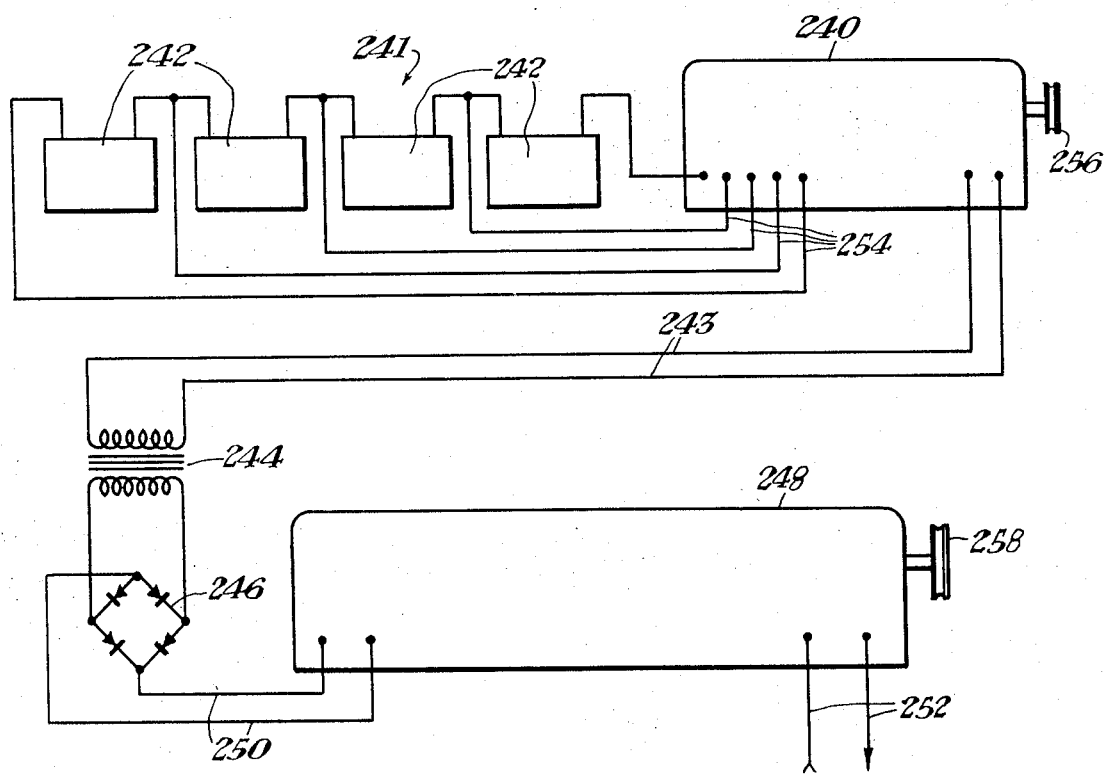

FIGS. 3A and 3B constitute a composite circuit diagram of still another form of my novel pulse amplifier; and FIG. 4 is a circuit diagram illustrating the tandem operation of my novel pulse amplifier for certain applications. Referring now to FIG. 1 of the drawings in greater detail a pulsed amplifier 10 includes a plurality of low voltage high capacity capacitors 12 which typically may have a capacity in the order of 50,000 mfd. or larger. Each of the capacitors 12 are connected through a rectifier 14 to a coherer or accumulator plate 16.

In this arrangement the capacitor bank 12 is coupled in parallel through conductors 18 and 20 to the negative terminal 22 of a suitable low voltage DC power supply such as a storage battery 23, or a low voltage rectifier energized by conventional line voltage.

The negative input terminal 22 also is connected, in this example, through conductor 24 to the negative output terminal 26. Suitable loads such as heating unit 28, light unit 30, or electric motor 118, can be connected across output terminals 26 and 32 through conductors 34, 36, or 119 respectively.

The positive output terminal 32, in this example, is connected through conductors 38 and 40 to the switch contacts of output relay 42 and thence through conductor 44 and branched conductor 46 to the accumulator plate 16. If desired, a switch 48 can be connected between conductors 38 and 40 to energize ammeter 50 for test purposes.

The output relay 42, in this example, is energized once during each rotation of rotary control switch 52, which additionally controls the charging of the capacitors 12 as described in detail below. The rotary switch 52 is provided with an elongated arcuate strip contact 54 the length of which determines the duration of the maximum discharge interval. The contact strip 54 is connected through conductor 56 to control electrode or gate 58 of a silicon controlled rectifier (SCR) 60. When the SCR 60 fires the low input voltage is applied first to time delay capacitor 62 and then to relay coil 64 through input conductor 66 and conductors 68 and 70 connecting the relay coil 64 to the SCR 60 and to the other input conductor 20 respectively. The time delay capacitor 62 desirably is employed to delay dumping or discharge of the accumulated charges supplied to the coherer plate 16 through rectifiers 14 until the SCR's 71 of the booster circuit described below are turned off.

In this arrangement of the invention the capacitors 12 are charged in sequence by connection in parallel to the source 23 through an equal number of SCR's 72 connected to the positive terminals respectively of the capacitors 12 through leads 74 and to the input conductor 66 through branched conductor 76. A rectifier bank 78 is coupled to conductor 76 to prevent the capacitors 12 from discharging to the input circuit.

The SCR's 72, in this example, are turned on sequentially to charge the capacitors 12 in sequence, by an equal number of contacts 80 of the rotary switch 52. This is accomplished through a main triggering circuit including conductor 82 connected to the positive input conductor 66, load resistance 84, a leveling diode 86, rotatable contact 88 of the rotary switch 52, and conductors 90 connected respectively to triggering electrodes or gates 92 of the charging SCR's 72 and rotary switch contacts 80. As the capacitors 12 are thus sequentially charged, their accumulating charges are applied to the coherer plate 16 where they are confined until discharge relay 42 is energized by rotary switch contact strip 54 in the manner described previously.

Following the sequential energization of the capacitors 12, in the manner just described, the rotary contact 88 then connects the main triggering circuit 82—86 to rotary switch booster contact 94, thus, triggering electrodes 98 of the aforementioned booster SCR's 72. The contact 94 can be elongated as in FIGS. 2 and 3. The parallel connected boosters SCR's 71, when thus rendered conductive, apply triggering potential from input conductor 66 and lead 100 to the branched triggering circuits 102 which are connected in bypassing relation to rotary switch stationary contacts 80, through load resistances 84' and triggering diodes 86' to the aforementioned conductors 90 and gates 92 of the charging SCR's 72. When the booster SCR's 71 are thus triggered, input voltage is supplied simultaneously to the booster leveling circuits 84'—86' and thence at a reduced triggering voltage, but simultaneously, to the gates 92 of the charging SCR's 72. The booster charge can be applied simultaneously to the capacitors 12 inasmuch as they have been very nearly fully charged, if not completely charged, by the previously sequential operation of the charging SCR's 72 during each rotation of the rotary switch 52. The booster charges compensates any tendency of the respective capacitor charges to leak away during a given revolution or cycle of the rotary switch 52. The load resistance 84 or 84' and the triggering and leveling diodes 86 and 86' reduce the input voltage to about 3 volts exemplarily required for triggering SCR's 72 and the boostering SCR's 71.

For testing purposes the booster SCR's 71 may be connected through rectifiers 104, branched conductor 106, normally open switch 108, and switch 48 to ammeter 50. A similar but normally closed switch 110 can be provided in conductor 76 for testing purposes.

In the operation of my novel amplifier according to FIG. 1, the rotary switch contact 88 is rotated in the direction denoted by arrow 112 and thus is moved into successive engagement with each of the sequential charging contacts 80 to sequentially trigger charging SCR's 72 for correspondingly charging the capacitors 12. After the last sequential contact 80 is engaged the rotary contact 88 then engages booster contact 94 to again supply charging potential to each of the capacitors 12, by simultaneous application of triggering voltage to all of the SCR gates 92. In the latter case, however, the triggering potential is applied through triggering circuits 102 connected to booster SCR's 71 to trigger all of the charging SCR's 72 simultaneously. Thence, the moving contact 88 engages contact strip 54 to trigger the relay SCR 60 to first energize the time delay capacitor 62 and then relay coil 64 to bridge the normally open relay contacts 114. The accumulated capacitor charges are then dumped from the coherer plate 16 through conductors 44, 40, 38 to the positive output terminal 32 to develop a pulse of both amplified voltage and amplified amperage across output terminals 26 and 32. The negative output terminal 26 remains, of course, at negative or ground potential.

When the amplifier 10 is energized from a rectified input having a ripple DC voltage, the various SCR's in the circuit are automatically turned off at the beginning of a succeeding wave form when the ripple voltage momentarily passes to zero. In those cases where the amplifier 10 is energized from a storage battery or other steady DC voltage source, it is desirable to connect a conventional vibrator or interrupter 116 in the positive input conductor 66 to turn off each of the SCR's after their triggering voltages are removed. For example the relay SCR 60 in the discharge circuit is thus automatically turned off immediately after the rotating switch contact 88 passes from the adjacent end of contact strip 54 to the first sequential triggering contact 80a.

The rate at which pulsed amplifier power is supplied to the loads 28 or 30 or the speed of the electric motor 118 can be readily varied by my novel amplifying circuit 10. In furtherance of this purpose, the rotary switch 52 desirably is rotated by a variable speed DC motor (not shown) which can be energized through appropriate leads by battery 23. Thus, it has been found experimentally that the amount of power supplied to the load devices such as heaters 28, lamps 30, and motor 118 is varied directly with the angular speed of the rotary switch contact 88.

Figure 2:
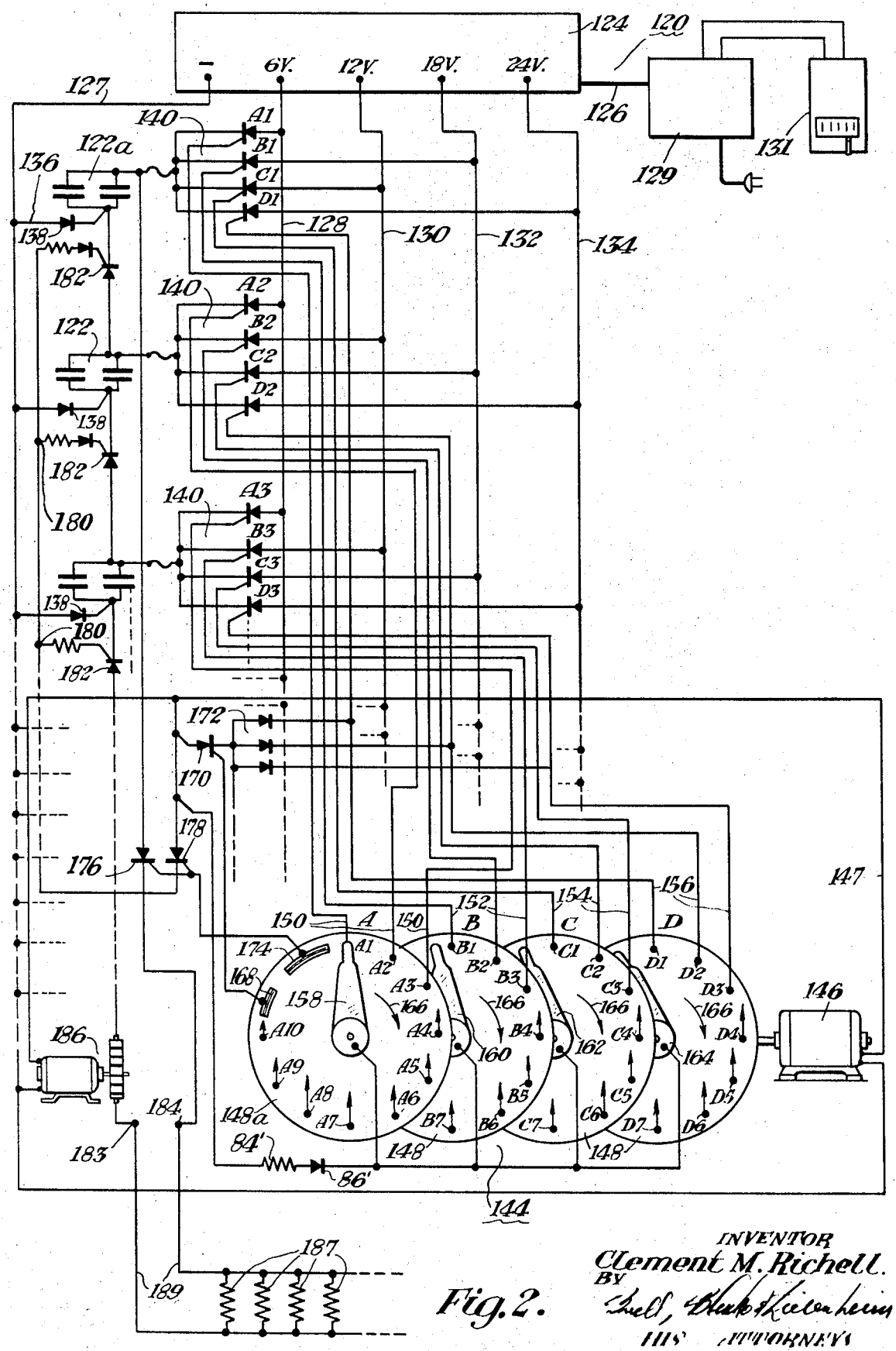
FIG. 2 is a circuit diagram of a modified form of my pulse amplifier.

Referring now to FIG. 2 of the drawings another form 120 of my pulsed power amplifier circuit is shown therein. In the latter arrangement a plurality of pairs of capacitors 122 are charged in sequence and discharged in parallel in much the same manner as described above in connection with FIG. 1. By way of illustration, ten pairs of the capacitors 122, or twenty capacitors in all, can be employed in this exemplary arrangement. It will be understood that a greater or lesser number can be employed either in the circuit of FIG. 2 or in that of FIG. 1 depending upon the application of the invention.

In the arrangement of FIG. 2 a rectified power supply 124 is employed which can be connected to conventional line voltage through leads 126. The power supply 124 provides a negative output on conductor 127, and in this example, various positive DC outputs indicated at the output terminals to which conductors 128, 130, 132 and 134 are connected. The negative conductor 127 is connected to each pair of capacitors 122 through conductors 136 and blocking rectifiers 138. On the other hand, each of the positive conductors 128—134 are connected individually to each paralleled pair of capacitors 122 through related conductor branches 140 and charging SCR's A1, B1, C1, D1; A2, B2, C2, D2; etc.

The increasing potentials on conductors 128—134 are successively applied to each pair of capacitors 122 by means of ganged rotating switches denoted generally by reference character 144. The ganged rotary switch 144 is rotated by a conventional, variable speed DC motor 146 connected to rectifier 124 through conductors 127, 147. In this arrangement each of the discs 148 comprising the rotary switch 144 are provided with 10 sequential charging contacts $a1-a10$, $b1-b10$, $c1-c10$, $d1-d10$, respectively, which are connected through conductors 150, 152, 154 and 156 to the gates of SCR's A1—A10, B1—B10, C1—C10, D1—D10, respectively. Thus, as the four rotatable switch contacts 158, 160, 162, 164 are rotated as denoted by arrows 166, the SCR's A1, B1, C1, D1, are sequentially fired to apply successively charging potentials, in this example 6 volts, 12 volts, 18 volts and 24 volts, to the first stack or pair of capacitors 122a. As evident from FIG. 2 the rotatable contacts 156—164 desirably are angularly displaced relative to one another so that the stationary switch contacts $a1, b1, c1, d1$, are initially and sequentially engaged by the associated rotatable contacts before the rotatable switch contact 158 successively engages stationary contact $a 2$ of the first disc 148a. This successively triggers the first bank of SCR's A1, B1, C1, D1, followed by the next bank of SCR's A2, B2, C2, D2 and so on until each pair of capacitors 122 are sequentially and successively energized by the four differing potentials from conductors 128—134.

After the last rotary switch contact D10 is contacted by the fourth rotatable contact 164, the first rotary contact 158 engages booster contact strip 168 of the associated disc 148a to trigger SCR 170 of the booster charging circuit. When the SCR 170 is thus turned on triggering potential as delimited by leveling diodes 172 is simultaneously applied to each of the charging SCR's D1—D10 to apply a booster charge equal to the highest output voltage of the power supply 124 from its output conductor 134 to all of the capacitors 122 simultaneously.

At the end of the booster charging interval, the length of which is determined by the length of the contact strip 168, the first rotatable contact 158 then engages the dump or discharge contact strip 174. The contact strip 174 supplies triggering potential as determined by load resistance 84' and leveling diode 86' to the gates of SCR's 176 and 178 in the discharge circuit. The SCR 178 establishes a series connection between the paired capacitors 122 through the branched conductor 180 by triggering series connecting SCR's 182 which are arranged in an alternating array with the pairs of capacitors 122. On the other hand, SCR 176 electrically connects the capacitors charged, now connected in series, to the positive load terminal 184.

The pulse circuit denoted generally by reference character 186 ensures turning off the discharge SCR's 176, 178 in the circuit upon removal of the triggering pulses supplied by the rotating ganged switch 144. The remaining SCR's are turned off automatically by the ripple DC voltage supplied by the rectifier unit 124, as noted previously in connection with FIG. 1.

During the charging period described above each of the several pairs of capacitors 122 is isolated from adjacent pairs of the capacitors by the blocking action of the SCR's 182 and by the discharge SCR 176 which are at that time in a nonconductive state.

After the first switch contact 158 leaves the adjacent end of the discharge contact strip 174 on disc 148a, the circuit 120 is then prepared for its next charging cycle. Only the rotary switch disc 148a is provided with booster and dump contact strips 168, 174 since the booster charging and the discharging functions are performed simultaneously but at different periods of a given operating cycle represented by a single revolution of the rotary switch 144. The circuit of FIG. 2 is similar in operation to that of FIG. 1, except that successively increasing charging voltages are applied to each pair of capacitors 122 for the purpose of preventing momentary overloads upon the power supply. In the event that storage batteries such as shown in FIG. 3 are substituted for the rectifier unit 124 the stepwise charging of the capacitors avoids large momentary power drains upon the batteries and allows time for the batteries to recuperate. Stepwise charging of the capacitors in addition prolongs the useful life of the capacitors. I have found that the capacitors do not become nearly as hot when charged in this manner. In addition, the capacitors 122 are discharged in series to provide a still further multiplication of voltage.

The circuit 120 (FIG. 2) is useful for those applications where line voltage is available. The amplifier circuit 120 by way of illustration can be employed for furnishing pulsed power to a series of heating elements or the like denoted generally at 187 and connected to the output terminals 183, 184 by means of conductors 189. The rectifier unit 124 for this application is coupled through its aforementioned input conductors 126 to relay switch 129, which is controlled by a conventional thermostat 131. The circuit of FIG. 2 can also be employed for controlling the operation of a conventional air conditioning system (not shown) in place of electric heating system 187.

In addition to other novel features described below, the amplifying circuit 190 of FIGS. 3A and 3B illustrates the use of a portable power supply 124' made up of a number of parallel-series connected storage batteries 192. In this example, 8 volt storage batteries are utilized in an interconnection providing a common negative conductor 126' and 6 volt, 12 volt, 18 volt, and 24 volt outputs on conductors 128'—134' respectively. It will be understood, of course, that the power supplies 124 and 124' (FIGS. 2 and 3) can be interchanged.

In the arrangement of FIG. 3 the capacitors 122 of each amplifier section 193, 195 are connected in pairs for successive charging purposes in the manner described previously in FIG. 2 by means of ganged switches 144' and charging SCR's A1'—A10 B1'—B10 etc. However, the pairs of capacitors 122' are connected for discharging purposes by branched conductors 194, 196, so that the capacitors 122' are discharged in parallel (FIG. 3) rather than in series (FIG. 2). For charging purposes branched conductor 196 includes blocking diodes 198. Thus, when discharging contact strip 174' is engaged by rotatable switch contact 158', a single discharge SCR 200 is triggered to connect the capacitor pairs in parallel across load terminals 201, 202 through branched conductors 194, 196.

A pulsing mechanism 204 of each amplifier section 193, 195 is coupled both to common negative conductor 126' to turn off the charging and booster SCR's and also to the discharge negative conductor 194 to turn off the discharge SCR 200 before the rotary switch contact 158' again engages switch contact A1 after leaving the adjacent end of contact strip 174'. Use of the dual pulse mechanism 204 is desirable owing to incorporation of a constant voltage power supply, in this example.

The pulse mechanisms 204 are operated by a common electric motor or other suitable motive means 206. Similarly, the ganged switches 144'a and 144'b of the amplifier sections 193, 195 respectively are mounted on a common shaft denoted generally by the reference character 208 for simultaneous actuation by drive motor 210. However, as denoted by the respective positions of the rotary contacts 158'a of the switch 144'a relative to the positions of the rotary contacts 158'b of the switch 144'b, the out-of-step relationship between the two ganged switches 144'a and 144'b provides some evening out of the output pulses supplied to the output terminals 201, 202 by parallel conductors 212, 214 respectively. A load device denoted generally by resistance 216 can be coupled to the output terminals 201, 202. In an exemplary application the load device can be an electric drive motor for an automotive vehicle or the like.

A As pointed out previously the duration and spacing of the power pulse applied to the load 216 can be varied by varying the speed of the DC motor 210 for the ganged switches 144'a, 144'b. The speed of the motor 216 or the rate at which power is otherwise supplied to some other load coupled to the output terminals 201, 202 can be adjusted by means of a suitable potentiometer 218. In the case of the aforementioned vehicle, the potentiometer can be controlled by a pedal accelerator structure (not shown) similar to the pedal 220 presently to be described.

Another arrangement for controlling the power supplied to the load 216 involves the use of a pivoted pedal 220 having a contactor segment 222 rigidly joined thereto. The segment 222 is provided with an arcuate contact strip 224 positioned for contacting engagement with a number of stationary contacts 226. The stationary contacts 226 are connected respectively through conductors 228 to the gates of SCR's 230 coupled respectively in output conductors 232—238 of the power supply 192.

In operation, with the accelerator pedal 220 in its solid outline position of FIG. 3 none of the SCR's 230 can fire with the result that no power is applied to any of the capacitor stacks. When the pedal is depressed to engage the arcuate contact segment 224 with the first of the contacts 226 the capacitors 122' can be charged to about 25 percent of their peak charge as only the SCR in output conductor 232 is rendered conductive. When the pedal 220 is depressed further so that the first two of the contacts 226 are engaged, the capacitors 122' are charged first to 25 percent then to 50 percent of their peak charge. Similarly successive coverage of three and then all four of the contacts 226 causes successive charging of the capacitance 122' to 75 percent and then to the fully charged condition.

However, the booster charge provided by rotary switch contacts 168 and the gate circuit SCR's 170 can be applied to the capacitors 122' only when the pedal accelerator 220 is fully depressed. The SCR's $D_1$—$D_{10}$ can only be reenergized for booster charge purposes when the output SCR 230 in conductor 238 is rendered conductive, as when all of the contacts 226 are bridged by the accelerator strip 224.

The operation of the circuit of FIG. 3 is otherwise generally similar to that of FIG. 2, with the exception that the capacitors 122' are paralleled for simultaneous discharge (FIG. 3) rather than being discharged in series (FIG. 2).

Referring now to FIG. 4 of the drawings, the use of two or more of my novel amplifier circuits in tandem for extremely high power pulses is illustrated. In an exemplary arrangement, primary amplifier 240 is coupled to a suitable DC power supply 241 including a number of parallel-series connected batteries 242, in this example, such as that shown and described in connection with FIG. 3. The pulse output of the amplifier 240 is connected through conductors 243 to a coupling transformer 244. The secondary circuit of the transformer 244 is connected to the input terminals of rectifier bridge 246, or other suitable rectifier means, the output terminals of which are connected to the input terminals of secondary amplifier 248 through leads 250. The output of the secondary amplifier 248 is supplied through suitable conductors 252 to an appropriate load device (not shown).

In the arrangement shown the primary amplifier 240 is similar in construction to the amplifier of either FIG. 2 or FIGS. 3A and 3B wherein the capacitors are charged stepwise from the differing voltages on power supply conductors 254. On the other hand the secondary amplifier 248, in this example, is arranged for energization by a single voltage power supply and can take the form of the amplifier shown in FIG. 1. Each of the amplifiers 240 or 248 is provided with a shaft and pulley or other suitable transmission 256 or 258 for driving the associated rotary switch (not shown in FIG. 4) coupled thereto.

In an experimental model the amplifiers 240, 248 were provided with banks of 20 and 100 capacitors respectively. The power supply 242 was arranged to deliver 6, 12, 18 and 24 volts respectively on the input conductors 254. It was found that the output pulses of the primary amplifier 240 peaked at nearly 2,000 watts while the output pulses of the secondary amplifier 248 peaked at over 10,000 watts.

From the foregoing it will be apparent that novel and efficient forms of an electronic pulsed power amplifier have been disclosed herein. While I have shown and described certain presently preferred embodiments of the invention and have illustrated presently preferred methods of practicing the same, it is to be distinctly understood that the invention is not limited thereto but may be otherwise variously embodied and practiced within the scope of the following claims.

I claim:

1. A power pulse amplifier comprising a plurality of capacitance means, a charging circuit for connecting each of said capacitance means in parallel to a source of charging potential, said circuit including charging switch means connected between each of said capacitance means and said potential source, sequential switch-actuating means coupled to said charging switch means for actuating said charging switch means in sequence to their conductive conditions so that said capacitance means are charged individually and sequentially, and a discharge circuit coupled to each of said capacitance means for discharging all of said capacitance means simultaneously, said discharge circuit including normally open switch means connected in an alternating array between said capacitance means, and means for simultaneously closing all of said normally open switch means to connect all of said capacitance means in series to said discharge circuit.

2. A power pulse amplifier comprising a plurality of capacitance means, a charging circuit for connecting each of said capacitance means in parallel to a source of charging potential, said circuit including charging switch means connected between each of said capacitance means and said potential source, sequential switch-actuating means coupled to said charging switch means for actuating said charging switch means in sequence to their conductive conditions so that said capacitance means are charged individually and sequentially, a discharge circuit coupled to each of said capacitance means for discharging all of said capacitance means simultaneously, additional switch means coupled in series with an output terminal of said discharge circuit and in parallel with said capacitance means, said additional switch means being coupled to said switch-actuating means for actuation to its conductive conditions after the sequential actuation of all of said charging switch means so that all of said capacitance means can be connected simultaneously in parallel to said discharge circuit.

3. A power pulse amplifier comprising a plurality of capacitance means, a charging circuit for connecting each of said capacitance means in parallel to a source of charging potential, said circuit including charging switch means connected between each of said capacitance means and said potential source, and sequential switch-actuating means coupled to said charging switch means for actuating said charging switch means in sequence to their conductive conditions so that said capacitance means are charged sequentially, a discharge circuit coupled to said capacitance means for discharging said capacitance means simultaneously, said capacitance means being coupled in parallel to a booster charging circuit coupled to said source for applying charging potential simultaneously to said capacitance means, and said booster charging circuit including additional switch means coupled to said switch-actuating means for actuation to its conductive condition after the sequential actuation of all of said first-mentioned switch means.

4. A power pulse amplifier comprising a plurality of capacitance means, a charging circuit for connecting each of said capacitance means in parallel to a source of charging potential, said circuit including charging switch means connected between each of said capacitance means and said potential source, and sequential switch-actuating means coupled to said charging switch means for actuating said charging switch means in sequence to their conductive conditions so that said capacitance means are charged sequentially and individually, a discharge circuit coupled to said capacitance means for discharging said capacitance means simultaneously, said switch means being SCR's, and said switch-actuating means including a sequential pulse emitting circuit for conducting triggering pulses in sequence to the gates respectively of said SCR's.

5. The combination according to claim 4 wherein load resistance means and a leveling diode are coupled in series with said pulse emitting circuit for determining the voltage level of said pulses.

6. The combination according to claim 4 wherein said charging source is a source of unvarying DC voltage, and periodic circuit interrupting means are coupled in series therewith for turning off said SCR's after removal of said triggering pulses.

7. A power pulse amplifier comprising a plurality of capacitance means, a charging circuit for connecting each of said capacitance means in parallel to a source of charging potential, said circuit including charging switch means connected between each of said capacitance means and said potential source, sequential switch-actuating means coupled to said charging switch means for actuating said charging switch means in sequence to their conductive conditions so that said capacitance means are charged sequentially, a discharge circuit coupled to said capacitance means for discharging said capacitance means simultaneously, said switch means being SCR's, and said switch-actuating means including a sequential pulse emitting circuit for conducting triggering pulses in sequence to the gates respectively of said SCR's, said pulse emitting circuit including rotary switch means having a rotatable contact connected to said source and stationary contacts coupled respectively to said SCR gates, and variable speed drive means for said rotary switch means.

8. The combination according to claim 3 wherein said first-mentioned switch means and said additional switch means are SCR's, said first-mentioned SCR's having their gates connected respectively to stationary contacts of a rotary switch forming part of said switch-actuating means, said additional SCR having its gate connected to an elongated stationary contact strip of said rotary switch means, said rotary switch means having a rotatable contact connected to a source of triggering potential.

9. A power pulse amplifier comprising a plurality of capacitance means, a charging circuit for connecting each of said capacitance means in parallel to a source of charging potential, said circuit including charging switch means connected between each of said capacitance means and said potential source, sequential switch-actuating means coupled to said charging switch means for actuating said charging switch means in sequence to their conductive conditions so that said capacitance means are charged sequentially and individually, a discharge circuit coupled to said capacitance means for discharging all of said capacitance means simultaneously, said capacitance means being connected in series by said discharge circuit, said discharge circuit including normally open switch means coupled in alternating array between said capacitance means, and said normally open switch means being so coupled to said sequential switch-actuating means that all of said normally open switch means are actuated simultaneously to their conductive conditions by said switch-actuating means after the sequential actuation of all of said charging switch means.

10. A power pulse amplifier comprising a plurality of capacitance means, a charging circuit for connecting each of said capacitance means in parallel to a source of charging potential, said circuit including charging switch means connected between each of said capacitance means and said potential source, and sequential switch-actuating means coupled to said charging switch means for actuating said charging switch means in sequence to their conductive conditions so that said capacitance means are charged sequentially, a discharge circuit coupled to said capacitance means for discharging said capacitance means simultaneously, said discharge circuit including an accumulator plate connected in parallel to each of said capacitance means.

11. The combination according to claim 10 wherein a blocking rectifier is coupled in series with each of said capacitance means and the point of connection thereof at said accumulator plate.

12. The combination according to claim 10 wherein said accumulator plate is connected through relay switch contacts to an output terminal of said amplifier, said relay switch having a coil therefor coupled in series with normally open switch means, said normally open switch means being coupled to said sequential switch actuating means for sequenced closure thereof after the sequenced actuation of said charging switch means.

13. A power pulse amplifier comprising a plurality of capacitance means, a charging circuit for connecting each of said capacitance means in parallel to a source of charging potential, said circuit including charging switch means connected between each of said capacitance means and said potential source, and sequential switch-actuating means coupled to said charging switch means for actuating said charging switch means in sequence to their conductive conditions so that said capacitance means are charged sequentially, a discharge circuit coupled to said capacitance means for discharging said capacitance means simultaneously, a booster circuit coupled to said charging switch means for actuating said charging switch means simultaneously following each cycle of sequential actuations thereof.

14. A power pulse amplifier comprising a plurality of capacitance means, a charging circuit for connecting each of said capacitance means in parallel to a source of charging potential, said circuit including charging switch means connected between each of said capacitance means and said potential source, and sequential switch-actuating means coupled to said charging switch means for actuating said charging switch means in sequence to their conductive conditions so that said capacitance means are charged sequentially, a discharge circuit coupled to said capacitance means for discharging said capacitance means simultaneously, said charging source including a plurality of differing output voltages, each of said capacitance means being coupled to said voltage source outputs through a like plurality of switch means connected in series-parallel between said voltage source outputs and to the associated one of said capacitance means, and said switch means in addition being coupled to said switch actuating means so that the switch means of each of said capacitance means are actuated in sequence for the application of respectively increasing charging voltages to each of said capacitance means.

15. The combination according to claim 14 wherein a booster charging circuit is provided, said booster circuit including means coupled only to those switch means connected to the highest voltage output of said charging source for simultaneously actuating said last-mentioned switch means to apply said highest output charging voltage simultaneously to said capacitance means following each sequential actuation of all of said switch means.

16. The combination according to claim 14 wherein the groups of sequentially actuated switch means coupled respectively to said capacitance means are actuated successively by said switch.

17. The combination according to claim 16 wherein said sequential switch actuating means include a like plurality of rotary switches, said switch means are SCR's the gate of those SCR's connected to a given one of said source outputs being connected respectively to a like number of stationary switch contacts of an associated one of said rotary switches, rotatable contacts of said rotary switches being angularly displaced relative to one another so that the SCR's of each group of SCR's are actuated sequentially before the sequential actuation of a succeeding group of said SCR's, and means are provided for simultaneously rotating said rotatable switch contacts.

18. The combination according to claim 1 wherein each of said capacitance means includes at least two capacitors connected in parallel to the associated one of said switch means.

19. A power pulse amplifier comprising a plurality of capacitance means, a charging circuit for connecting each of said capacitance means in parallel to a source of charging potential, said circuit including charging switch means connected between each of said capacitance means and said potential source, and sequential switch-actuating means coupled to said charging switch means for actuating said charging switch means in sequence to their conductive conditions so that said capacitance means are charged sequentially, a discharge circuit coupled to said capacitance means for discharging said capacitance means simultaneously, a booster circuit coupled to said potential source and in parallel to said capacitance means for charging said capacitance means simultaneously following the sequential charging thereof by said switch means.

20. The combination according to claim 8 wherein said rotary switch means includes a second contact strip disposed between said first-mentioned contact strip and the initial one of said stationary contacts, said second contact strip being coupled to the gate of an SCR in said discharge circuit so that said capacitance means are discharged immediately following interruption of said booster circuit.

21. The combination according to claim 14, wherein a like number of additional switch means are connected respectively between said source outputs and the adjacent ones of said first-mentioned switch means, said additional switch means being coupled to second switch-actuating means for connecting selected ones or all of said outputs to said first-mentioned switch means.

22. A power pulse amplifier comprising a plurality of capacitance means, a charging circuit for connecting each of said capacitance means in parallel to a source of charging potential, said circuit including charging switch means connected between each of said capacitance means and said potential source, and sequential switch-actuating means coupled to said charging switch means for actuating said charging switch means in sequence to their conductive conditions so that said capacitance means are charged sequentially, a discharge circuit coupled to said capacitance means for discharging said capacitance means simultaneously, said charging circuit including circuit means for sequentially charging said capacitance means with successively increasing voltages from said source.